US012638358B1

(12) United States Patent
Davis et al.

(10) Patent No.: US 12,638,358 B1
(45) Date of Patent: May 26, 2026

(54) HIGH-PRESSURE HYDROGEN TEST FIXTURE

(71) Applicant: National Technology & Engineering Solutions of Sandia, LLC, Albuquerque, NM (US)

(72) Inventors: Brendan Cavin Davis, Concord, CA (US); Christopher William San Marchi, Pleasanton, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 318 days.

(21) Appl. No.: 18/412,727

(22) Filed: Jan. 15, 2024

(51) Int. Cl.
G01M 3/28 (2006.01)

(52) U.S. Cl.
CPC ................................. G01M 3/2853 (2013.01)

(58) Field of Classification Search
CPC .................................................... G01M 3/2853
See application file for complete search history.

(56) References Cited

U.S. PATENT DOCUMENTS

| | | | | |
|---|---|---|---|---|
| 7,552,643 | B2 * | 6/2009 | Aikens | G01M 3/223 |
| | | | | 73/756 |
| 8,096,169 | B2 * | 1/2012 | Bearden | G01M 3/085 |
| | | | | 73/49.7 |
| 8,820,155 | B2 | 9/2014 | Ramotowski | |
| 10,988,723 | B1 * | 4/2021 | Hatch | C12M 23/46 |
| 2012/0204650 | A1 * | 8/2012 | Kleven | G01N 29/2462 |
| | | | | 73/644 |
| 2013/0295551 | A1 * | 11/2013 | Eddington | A01N 1/146 |
| | | | | 435/284.1 |
| 2018/0172215 | A1 | 6/2018 | Sirosh et al. | |
| 2020/0131466 | A1 * | 4/2020 | Hsieh | C12M 41/48 |
| 2023/0159872 | A1 * | 5/2023 | Varone | C12N 5/0679 |
| | | | | 435/284.1 |

* cited by examiner

*Primary Examiner* — Helen C Kwok
(74) *Attorney, Agent, or Firm* — Calfee, Halter & Griswold LLP; Samantha Updegraff; Mario A. Burgarello

(57) ABSTRACT

A high-pressure hydrogen test fixture includes a main body having a test cavity, a flange covering the test cavity when attached to the main body to thereby form a test chamber, a plurality of flange bolts and corresponding nuts to attach the flange to the main body, a flange seal arranged in a seal groove of the main body, an inlet channel between the test chamber and an inlet port, a vent channel between the test chamber and a vent port, and a sample carrier. The flange seal forms a seal between a sealing surface of the flange and the seal groove of the main body. The sample carrier has at least one of a face seal groove and a radial seal groove for receiving a test article. A seal formed by the test article and the test fixture is arranged between the inlet channel and the vent channel.

20 Claims, 8 Drawing Sheets

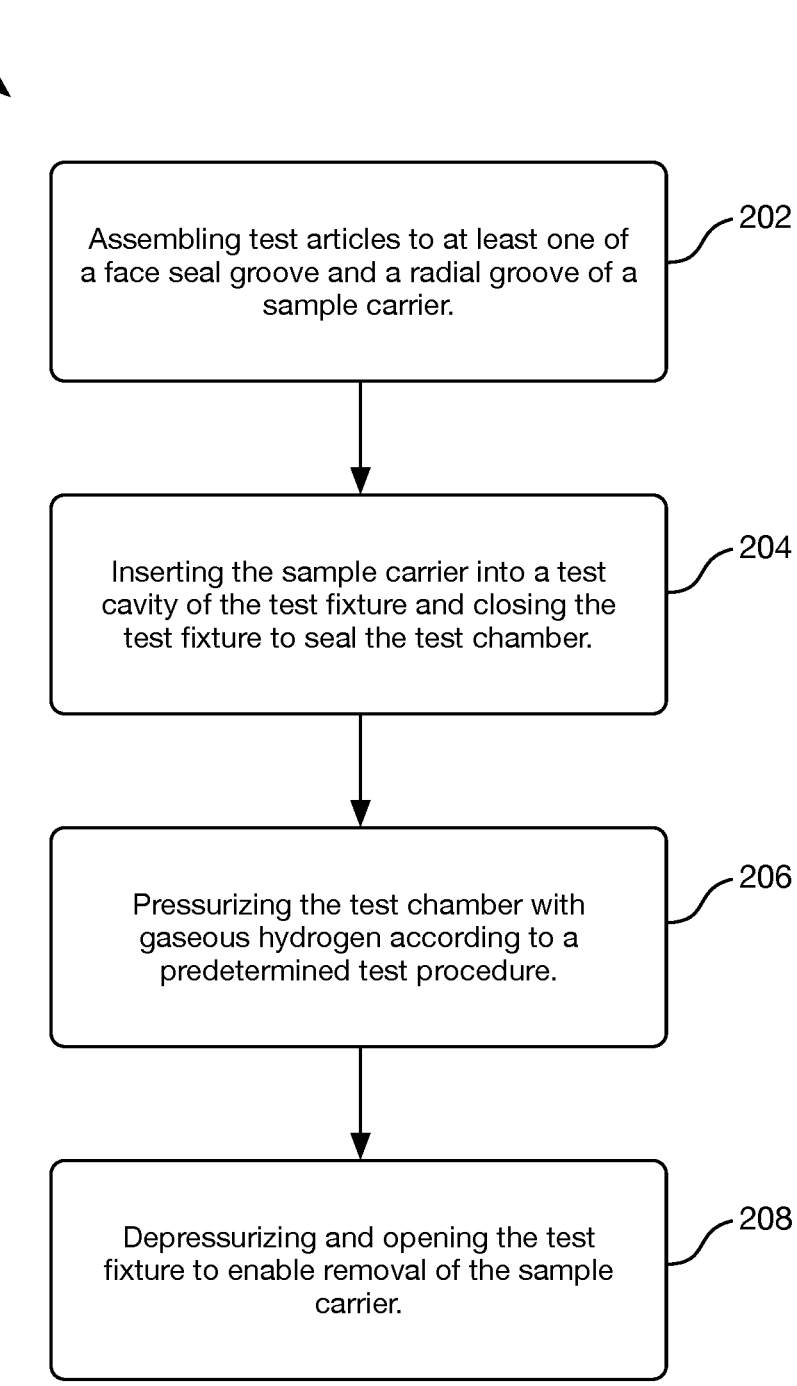

200

202
Assembling test articles to at least one of a face seal groove and a radial groove of a sample carrier.

204
Inserting the sample carrier into a test cavity of the test fixture and closing the test fixture to seal the test chamber.

206
Pressurizing the test chamber with gaseous hydrogen according to a predetermined test procedure.

208
Depressurizing and opening the test fixture to enable removal of the sample carrier.

FIG. 11

HIGH-PRESSURE HYDROGEN TEST FIXTURE

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

FIELD OF THE INVENTION

The present invention relates to fixtures used to test pressure seals in an installed condition, and, in particular, to testing the performance of pressure seals in a high-pressure hydrogen environment.

BACKGROUND

Designers of fluid components used in hydrogen gas systems must pay particular attention to the selection of materials used to make the fluid components because of the unique properties of gaseous hydrogen. One consideration is a consequence of the very small physical size of the $H_2$ molecules of gaseous hydrogen. Having a smaller physical size means that $H_2$ molecules can travel through small gaps or leak paths between components—e.g., between a seal and a sealing surface—that would be unavailable to molecules of other gasses such as $N_2$ molecules of gaseous nitrogen. The small physical size of hydrogen molecules also enables those molecules to permeate through sealing materials so that the hydrogen gas leaks from the fluid system without flowing through a leak path between two sealing components. Hydrogen permeating into a material can affect the physical properties of the material, even if the hydrogen does not ultimately escape the container. For example, hydrogen gas is known to cause some metallic materials to become brittle; such hydrogen embrittlement can result in the formation of fractures in the fluid system components that allow for leakage from the system or mechanical failure of the components. In view of the difficulties presented by the containment of hydrogen gas, materials used in hydrogen systems must be tested for compatibility with hydrogen prior to their use in gaseous hydrogen systems. There are currently no suitable technologies that allow for testing applicability of materials with respect to pressurized hydrogen gas. Specifically, technologies currently used for testing applicability of materials with respect to hydrogen gas poorly emulate operating conditions to which the materials will be subjected.

SUMMARY

The following is a brief summary of subject matter that is described in greater detail herein. This summary is not intended to be limiting as to the scope of the claims.

A high-pressure hydrogen test fixture includes a main body having a test cavity, a flange covering the test cavity when attached to the main body to thereby form a test chamber, a plurality of flange bolts and corresponding nuts to attach the flange to the main body, a flange seal arranged in a seal groove of the main body, an inlet channel between the test chamber and an inlet port, a vent channel between the test chamber and a vent port, and a sample carrier. The flange seal forms a seal between a sealing surface of the flange and the seal groove of the main body. The sample carrier has at least one of a face seal groove and a radial seal groove for receiving a test article. A seal formed by the test article and the test fixture is arranged between the inlet channel and the vent channel.

A method of testing a polymer seal in a high-pressure hydrogen test fixture includes steps of assembling a test article to a least one of a face seal groove and a radial seal groove of a sample carrier, placing the sample carrier into a test cavity of the test fixture and closing the test fixture to form a test chamber by sealing the test article against the test fixture, filling the test chamber with hydrogen gas pressurized to a predetermined test pressure, and depressurizing the test chamber and opening the test fixture to enable removal of the sample carrier.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 11 is a flow diagram that illustrates an exemplary methodology for operating an exemplary test fixture.

DETAILED DESCRIPTION

Figure 1:
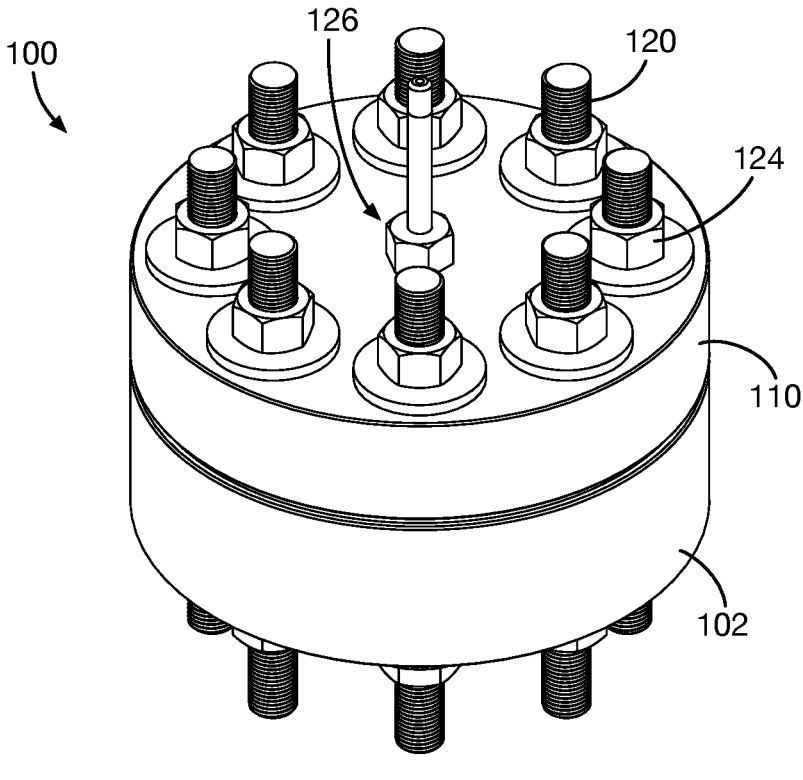
FIG. 1 shows a top perspective view of a closed test fixture.
Figure 2:
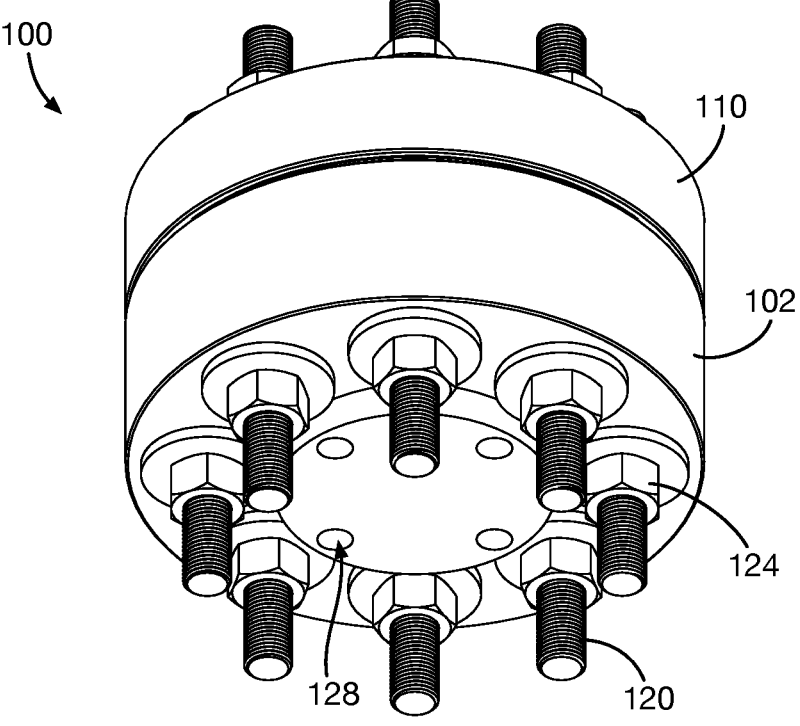
FIG. 2 shows a bottom perspective view of the test fixture of FIG. 1.

Various technologies pertaining to gas processing and solar-thermal chemical reactors for performing the same are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Material testing of polymer materials used in seals for hydrogen systems has typically been performed in autoclave pressure vessels. The polymer material to be tested is divided into several test samples and placed in receptacles that are exposed to high-pressure hydrogen in static, cycling, or rate-controlled pressure conditions. Unlike the condition of the polymer seals in field conditions, the pieces of polymer material are mechanically unconstrained in the receptacles during testing. Consequently, the performance of the polymer samples in the test environment differs from the performance of polymer seals installed in valves and other fluid system components, even though the samples and seals are formed from the same material. In particular, it has been discovered that the integrity of the polymer seals is influenced by the constraint that O-ring grooves and similar component features provide.

To provide a more true-to-reality testing environment, exemplary test fixtures described herein have been developed. Exemplary test fixtures provide for the testing of polymer seals in various configurations—such as, for example, radial sealing and face sealing configurations—to expose the polymer seals to pressurized hydrogen in the same manner as the seals would be exposed during real-world applications. During testing, the polymer seals are used as the primary seal for the high-pressure hydrogen in the test chamber and a back-up or secondary seal ensures that any hydrogen that leaks past the polymer seals being tested is captured and/or safely vented. The exemplary test fixtures described herein can be used to static, cyclical, and rate-controlled high pressure hydrogen testing. The test fixture can also be extended via the addition of an intermediate body for extending the test chamber. Multiple exemplary test fixtures can be attached to in a high pressure gas manifold via standard connections to provide for testing additional polymer seals.

Referring now to FIGS. 1-8, an exemplary test fixture 100 for performing high pressure hydrogen testing of polymer seals is shown. The test fixture 100 includes a main body 102 in which a test cavity 104 (FIG. 5) is formed for receiving a sample carrier or spud 106 (FIGS. 5-8) to which one or more polymer seal test articles 108 are attached. A flange 110 covers the test cavity 104 and closes against the main body 102 to form a test chamber 112 (FIG. 9) that contains the sample carrier 106. A flange seal or a vent seal 114 is arranged in a seal groove 116 formed in the main body 102. When the flange 110 is closed against the main body 102 the flange seal 114 is pressed between a seal surface 118 of the flange 110 and the seal groove 116 of the main body 102 to prohibit leakage between the flange 110 and the main body 102. A portion of the seal surface 118 of the flange 110 is optionally provided on a protrusion or boss 150 that extends downward from the flange 110 and into the test cavity 104 of the main body 102.

Components of the test fixture 100 that are exposed to pressurized hydrogen can be made from materials that are known to be resistant to hydrogen embrittlement, such as austenitic stainless steels with a known performance history in hydrogen to mitigate hydrogen embrittlement effects of the metals. The test fixture 100 is designed to be used with and contain hydrogen pressurized up to about 1000 bar (about 14.5K psi) for regular testing. The test fixture 100 has a maximum working pressure of about 1380 bar (about 20K psi) and a proof strength of up to about 2050 bar (about 29.7K psi).

Figure 3:
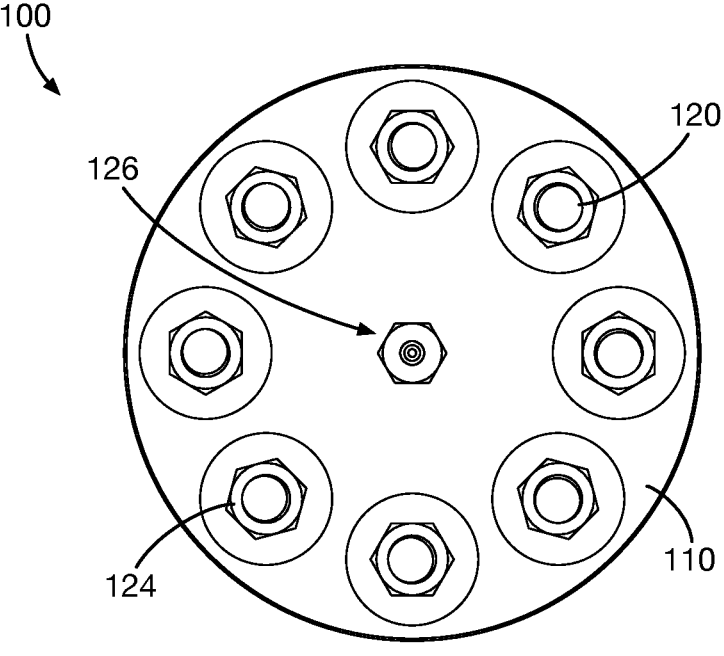
FIG. 3 shows a top view of the test fixture of FIG. 1.
Figure 4:
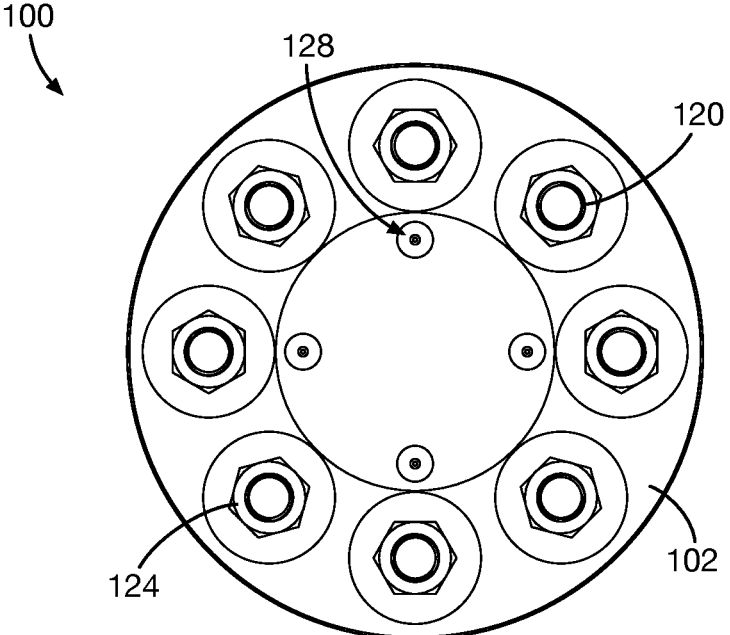
FIG. 4 shows a bottom view of the test fixture of FIG. 1.

A plurality of flange bolts 120 are inserted through bolt holes 122 that extend through the main body 102 and flange 110 (FIGS. 3-4). Once the flange 110 is closed against the main body 102, nuts 124 are threaded onto the flange bolts 120 and tightened to a desired torque to compress the flange 110 against the main body 102 to ensure that the test fixture 100 remains closed while testing is performed. The flange bolts 120 are arranged in a circular pattern centered on a central axis of the test fixture 100. The flange bolts 120 are sized according to known standards for sealing flanges of fluid systems operating at high pressures. While FIGS. 3-4 show eight flange bolts 120 arranged in a circular pattern, any number of flange bolts at a suitable size can be used to secure the flange 110 to the main body 102 of the test fixture. The illustrated embodiment shows the flange bolts 120 extending through bolt holes 122 formed in the flange 110 and the main body 102, however, the flange bolts can be integrally formed with or permanently attached to one of the flange 110 and the main body 102 so that the flange bolts 120 extend through bolt holes 122 formed in only one of the flange 110 and the main body 102.

The test fixture 100 is shown as having a cylindrical shape, however, the test fixture 100 can be formed in any suitable exterior shape for containing high pressure hydrogen during testing and can have a cross section, such as, for example, a rectangle, a hexagon, or any suitable polygon. While the exterior of the test fixture 100 can have any shape, the test chamber 112 (FIG. 9) and sample carrier 106 are formed in the shape of the polymer seal being tested, which is typically cylindrical to test O-rings and similar seals. The exterior of the test fixture 100 can also include a wide variety of mounting brackets and other attachment points for supporting the test fixture 100. For example, mounting brackets can be secured to the test fixture 100 via the flange bolts 120, or can be welded to the main body 102 and/or the flange 110, or can be fastened to the main body 102 and/or the flange 100 using any suitable fastener.

Pressurized hydrogen is provided to the test fixture 100 from a source (not shown) such as, for example, a tank of pressurized hydrogen or a compressor. The source of pressurized hydrogen is fluidly connected to an inlet port 126 formed in the flange 110. The inlet port 126 is fluidly connected to the test chamber 112 to expose the polymer seal test articles 108 to hydrogen pressurized to a desired pressure during a testing operation. One or more vent ports 128 formed in the main body are fluidly connected to the test chamber 112 outside of the location of the test articles 108 so that any leakage out of the test chamber 112 during a testing operation is safely captured and vented away from the test fixture 100. The inlet port 126 and the one or more vent ports 128 can be formed as any suitable fitting for containing high pressure case, such as, for example, standard ⅛" high pressure connections. The internal fluid pathways of the test fixture 100 are described in greater detail, below.

Figure 5:
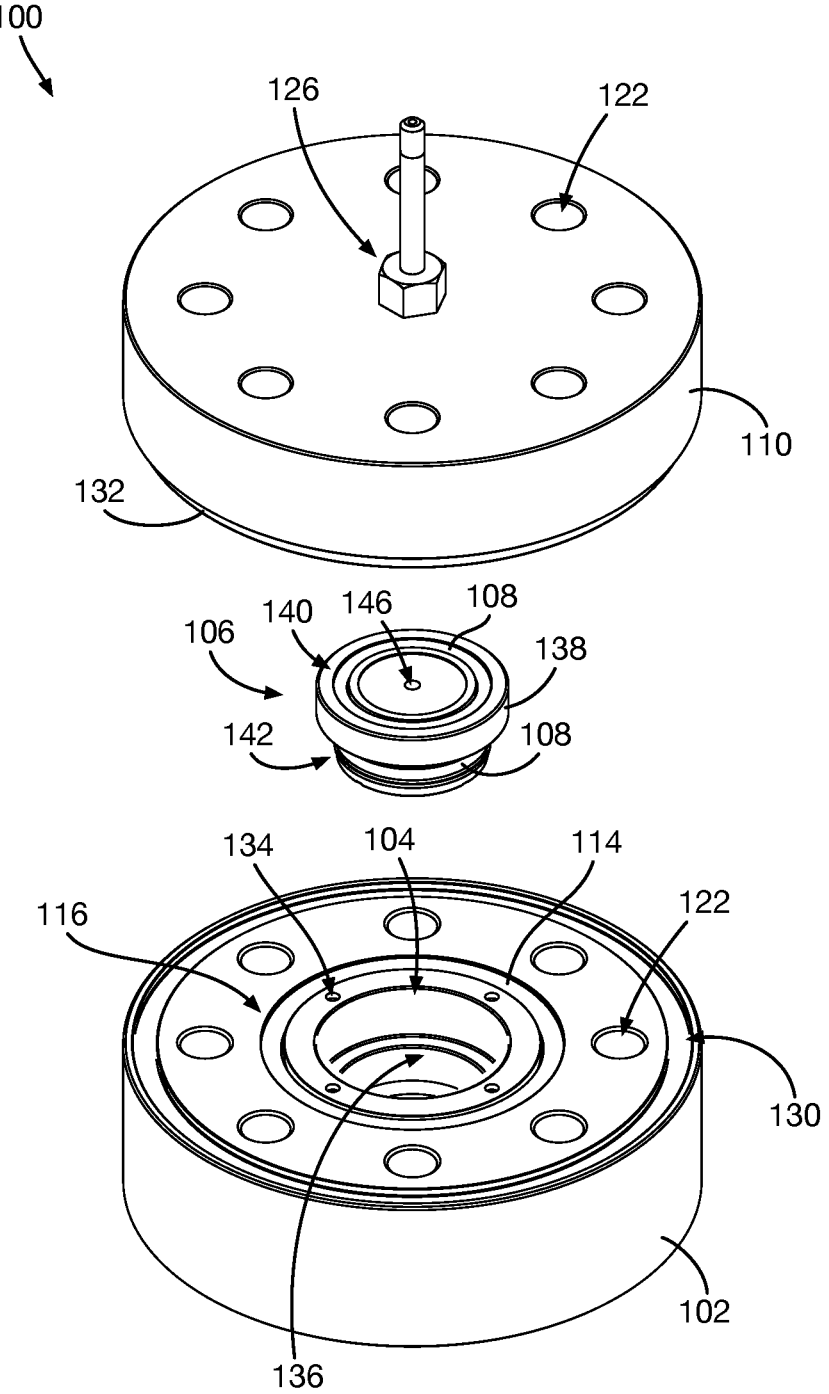
FIG. 5 shows a top perspective view of the test fixture of FIG. 1 in an exploded condition.
Figure 6:
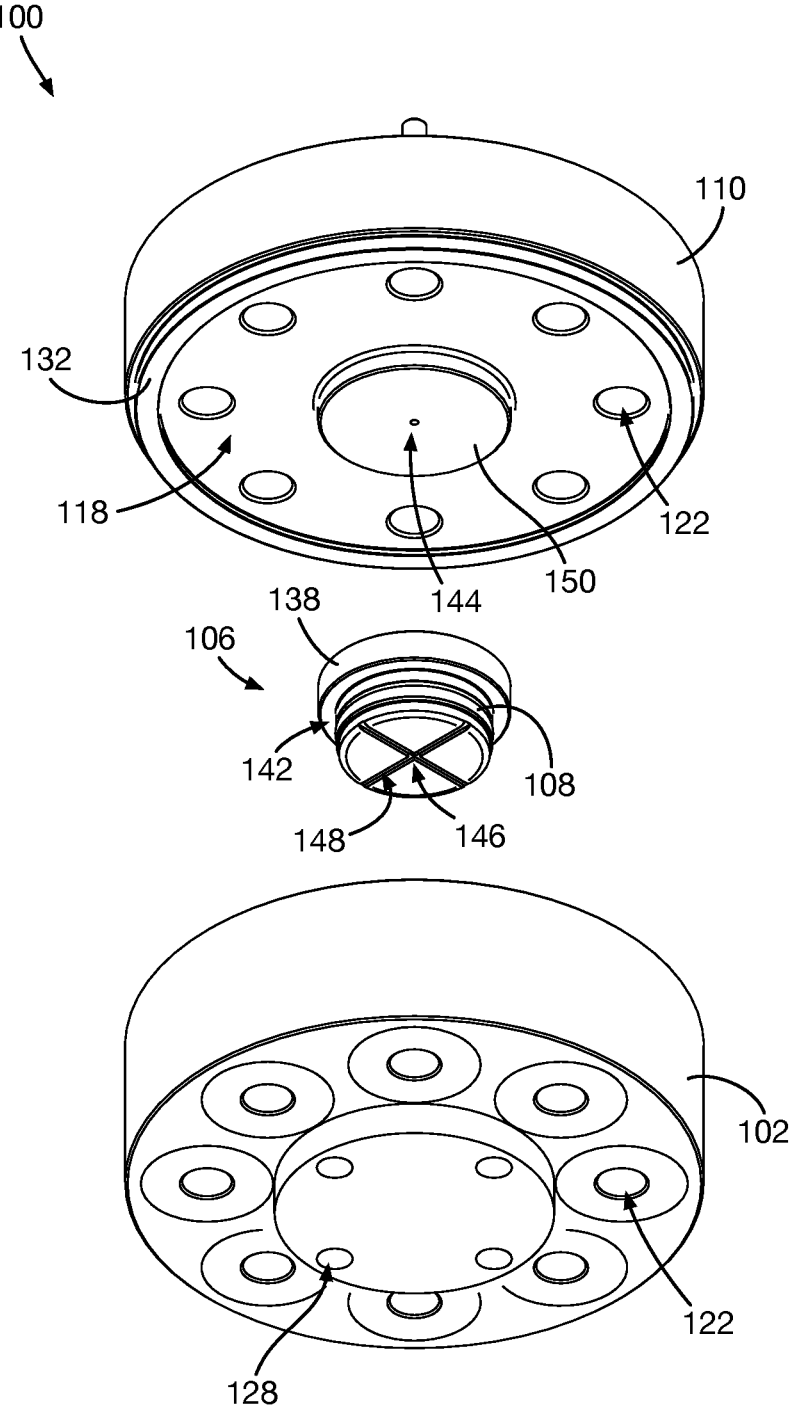
FIG. 6 shows a bottom perspective view of the test fixture of FIG. 5.

Referring now specifically to FIGS. 5-6, exploded views of the test fixture 100 are shown with the flange bolts 120 removed so that the interior of the test fixture 100 can be seen. The main body 102 includes an alignment groove or cavity 130 for receiving an alignment protrusion 132 of the flange 110. The alignment groove 130 and alignment protrusion 132 can take on a wide variety of forms and can be any set of corresponding features that facilitate the proper alignment of the flange and the main body. For example, as can be seen in FIGS. 5-6, the alignment groove 130 can be a circular groove arranged near the outer surface of the main body 102 and the alignment protrusion 132 can be a corresponding ring that extends from the flange 110. The alignment cavity 130 can be one or more holes with straight or sloped sides and the alignment protrusion 132 can be a corresponding number of pins or posts arranged so that they align with the holes when the flange 110 is attached to the main body 102.

Vent channels 134 penetrate through the main body between the seal groove 116 and the test cavity 104 to capture gas that leaks out of the test chamber 112 during a test operation. The vent channels 134 extend through the main body 102 to fluidly connect with the vent ports 128. The test fixture 100 can include just one inlet port 126 and inlet channel 144 and have more than one vent ports 128 and vent channels 134 to provide an increased flow capacity to accommodate the increase in volume of the pressurized hydrogen that leaks from the test chamber 112 and expands as the gas decreases in pressure in the vent channels 144. Some implementations of the test fixture 100 include additional vent channels and sealing components so that the source of the leakage can be determined—e.g., which test article 108 has allowed leakage—without opening the test fixture 100. As can be seen in FIG. 5, the test cavity 104 includes a shoulder 136 for engaging and supporting a flange 138 of the sample carrier 106. The sample carrier 106 can be formed from the same material that would be used with the test articles 108 in the field, or can be formed from any suitable material, such as, for example, austenitic stainless steels and other metal alloys with a known performance history in hydrogen environments.

Figure 7:
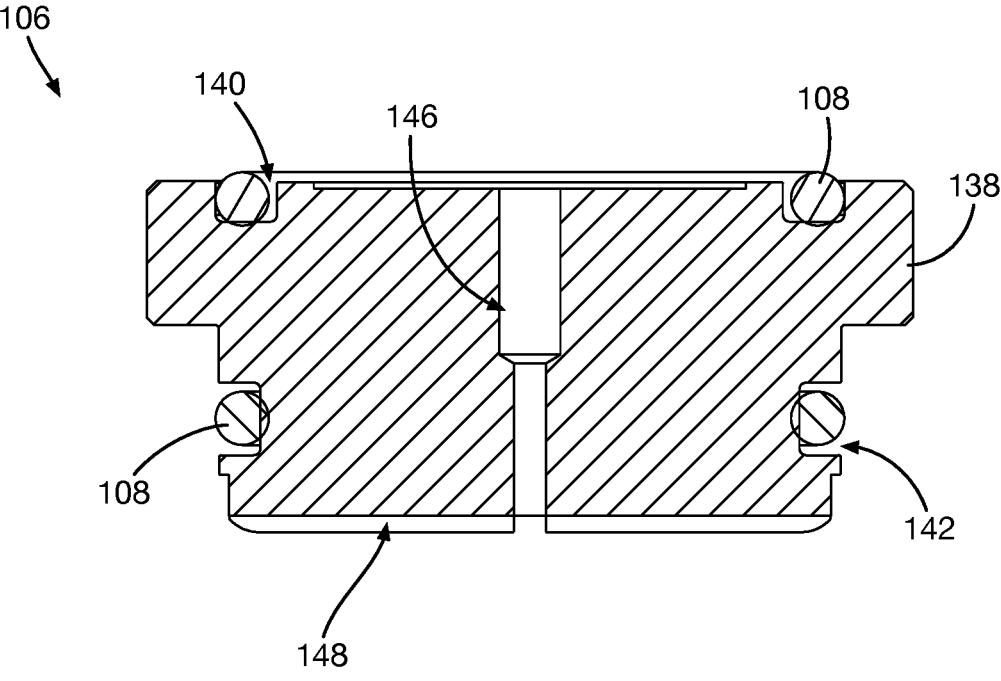
FIG. 7 shows a cross-sectional view of a sample carrier.
Figure 8:
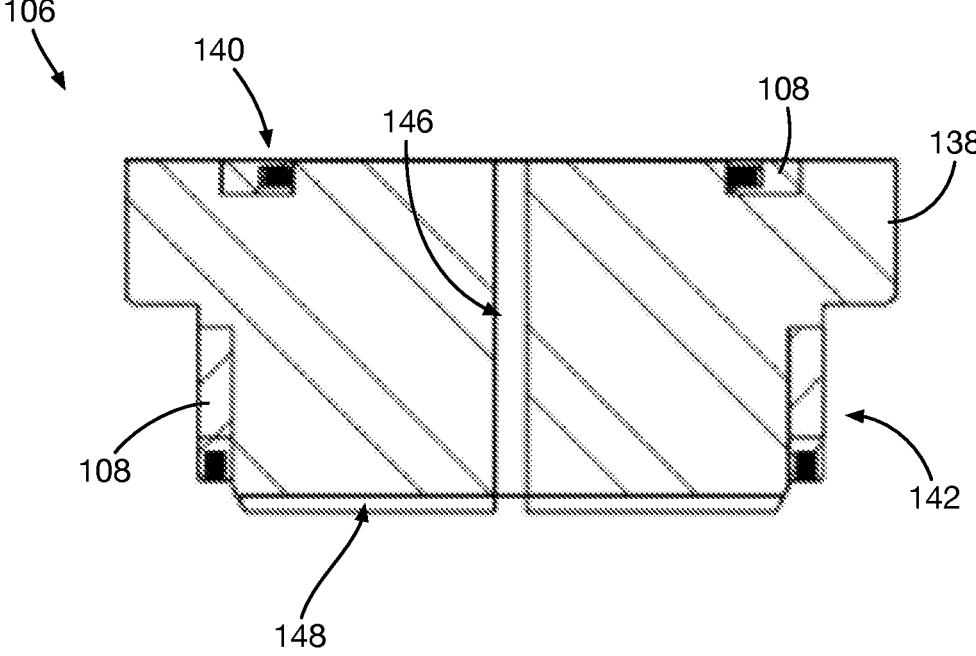
FIG. 8 shows a cross-sectional view of another sample carrier.

The sample carrier 106 includes a face seal groove 140 and a radial groove 142 for receiving polymer seal test articles 108, as can be seen in the cross-sectional views of two different sample carriers 106 shown in FIGS. 7-8. The size, cross-sectional geometry, and overall shape of the seal grooves 140, 142 can be modified in different sample carriers 106 to test how the seal groove geometry impacts the performance of the test articles 108. In some implementations, the sample carrier 106 includes only face seal grooves 140 and does not include radial seal grooves 142. In some implementations, the sample carrier 106 includes only radial seal grooves 142 and does not include face seal grooves 140. The seal grooves 140, 142 can also be configured for a wide variety of polymer seals, such as, for example, O-rings (FIG. 7) and metal spring energized seals (FIG. 8). The sample carrier 106 can also include multiple seal grooves 140, 142 of the same type—e.g., a plurality of face seal grooves 140 for testing face seals of varying sizes and/or a plurality of radial seal grooves 142 for testing radial seals of the same or varying sizes.

Figure 9:
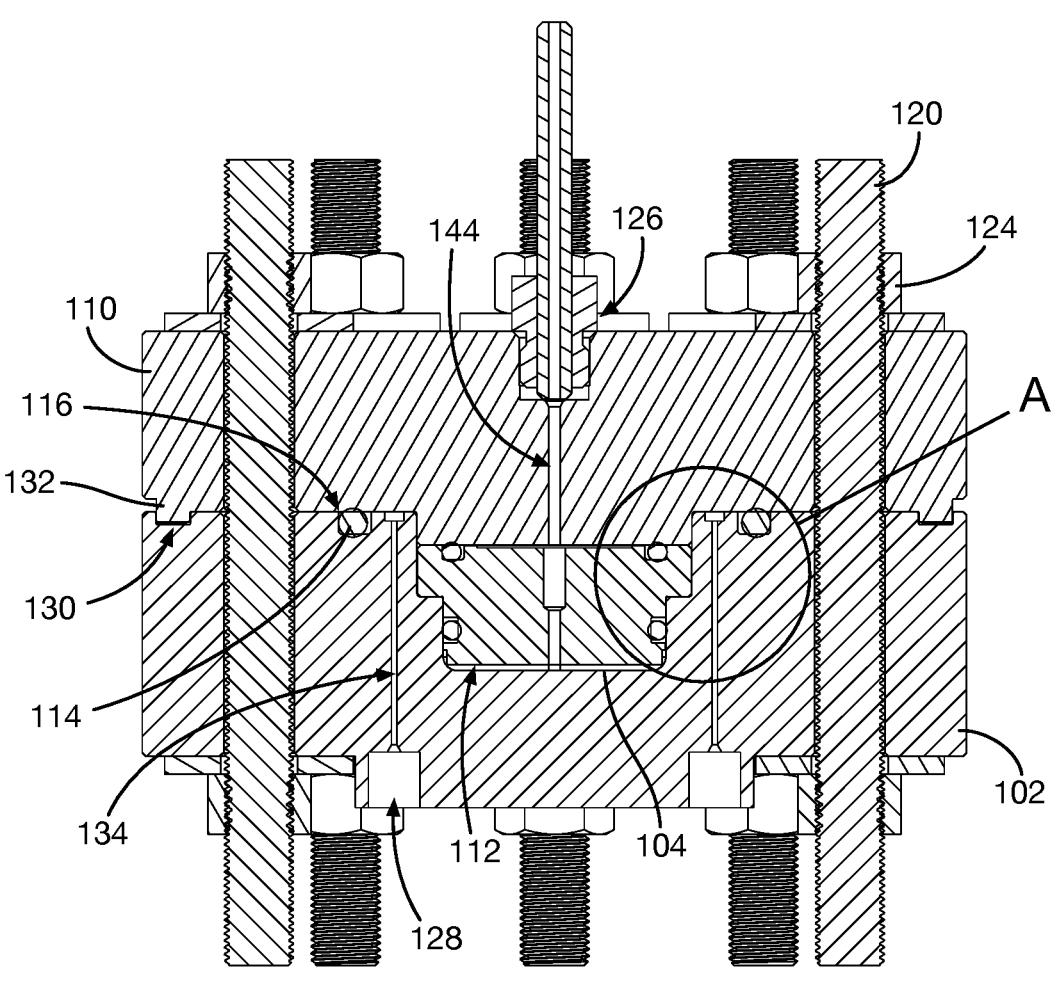
FIG. 9 shows a cross-sectional view of the test fixture of FIG. 1.
Figure 10:
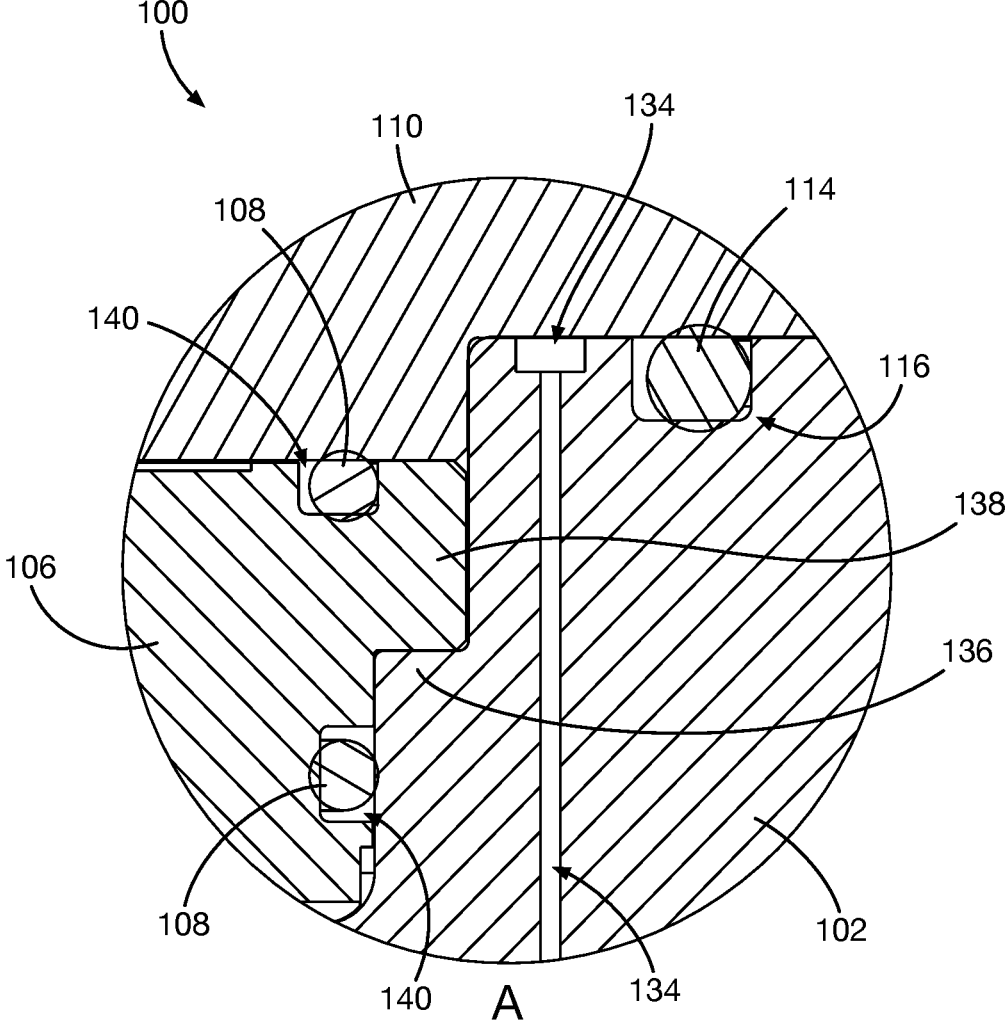
FIG. 10 shows an enlarged detail view of the area A of FIG. 9.

Referring now to FIGS. 9-10, cross-sectional views of the test fixture 100 are shown to illustrate the flow paths through the test fixture 100. An inlet channel 144 through the flange 110 fluidly connects the inlet port 126 to the test chamber 112. Pressurized hydrogen supplied through the inlet channel 144 to the test chamber 112 pressurizes the polymer seal test article 108 placed in the face seal groove 140 to test the seal formed by and between the test article 108, the seal surface 118 of the flange 110, and the face seal groove 140 of the sample carrier 106. An optional center channel 146 (FIGS. 7-8) and bottom channels 148 (FIGS. 7-8) allows pressurized hydrogen to pass through the sample carrier 106 to the bottom of the test chamber 112 to pressurize the test article 108 placed in the radial seal groove 142 to test the seal formed by and between the test article 108, the shoulder 136 of the test cavity 104, and the radial seal groove 142 of the sample carrier 106.

Referring now to FIG. 10, leak paths from the test chamber 112 to the vent channels 134 are shown in the enlarged detail view of the area A of the cross-sectional view of the test fixture 100 shown in FIG. 8. That is, if one or both of the test articles 108 fail during a test operation, the pressurized hydrogen is allowed to exit the test chamber 112 and flow through one of the vent channels 134 to exit the test fixture 100 via the one or more vent ports 128. Leakage from the test fixture 100 between the flange 110 and the main body 102 is prohibited by the flange seal 114. Consequently, a wide variety of sample carriers 106 and test articles 108 having a wide variety of seal geometries and sizes can be tested using the same test fixture 100. Additionally, an intermediate body (not shown) can be inserted between the flange 110 and the main body 102 to extend the size of the test cavity 104 so that additional sample carriers 106 can be pressurized in the test fixture 100 at the same time.

The illustrated test fixture 100 includes ports 126, 128 arranged on the exterior of the flange 110 and main body 102 and internal fluid channels 134, 144 for connecting the ports 126, 128 to the test chamber 112 formed by closing the flange 110 against the main body 102. However, the ports 126, 128 can be arranged in either of the flange 110 and the main body 102 with the internal fluid channels 134, 144 being re-arranged accordingly. Similarly, the seal groove 116, alignment groove 130, and alignment protrusion 132 can be arranged in either of the flange 110 and main body 102. That is, the arrangement of the wetted—i.e., fluid carrying—areas of the test fixture 100 can be re-arranged so long as the test fixture 100 can be closed to create the test chamber 112 that can be pressurized to a desired test pressure with gaseous hydrogen. For example, all of the ports 126, 128 and channels 134, 144 could be arranged in the flange 110 or in the main body 102 with the other of the flange 110 or main body 102 merely being used as a lid to contain pressure in the test chamber 112.

FIG. 11 illustrates an exemplary methodology 200 related to operation of high-pressure hydrogen testing systems, such as the test fixture 100. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

The methodology 200 facilitates the testing of a polymer seal in a test fixture for high-pressure gaseous hydrogen. The methodology 200 begins at 202 by assembling test articles to at least one of a face seal groove and a radial seal groove of a sample carrier. The sample carrier can be any of the sample carriers described herein and is configured to receive the test articles for insertion into a test cavity of the test fixture. The test chamber is formed by the closure of a flange onto a main body and includes a flange seal arranged in a seal groove of the flange or main body. At 204, the sample carrier is inserted into the test cavity of the test fixture and the test fixture is closed to seal the test chamber and at 206 high-pressure hydrogen is provided to an inlet port of the test fixture to pressurize the test chamber with high-pressure hydrogen according to a predetermined test procedure. During testing, any leakage through the seal formed by the test articles is captured by the test fixture and directed to vent ports. The test fixture is depressurized and opened at 208 to remove the sample carrier and the test articles for inspection. The methodology 200 can be performed using any of the test fixtures described herein.

Therefore, technologies are described herein in accordance with at least the following examples.

(A1) In an aspect, a high pressure hydrogen test fixture is described, where the test fixture includes a main body that includes a test cavity. The test fixture also include a flange that covers the test cavity of the main body when the flange is attached to the main body to form a test chamber. The test fixture further includes a plurality of flange bolts extending through at least one of the flange and the main body for securing the flange to the main body via a plurality of corresponding nuts. The test fixture additionally includes a flange seal arranged in a seal groove of the main body, wherein the flange seal forms a seal between a sealing surface of the flange and the seal groove of the main body when the flange is attached to the main body. Moreover, the test fixture includes an inlet channel in fluid communication with the test chamber and an inlet port. The test fixture also includes a vent channel in fluid communication with the test chamber and a vent port. The test fixture further includes a sample carrier comprising at least one of a face seal groove and a radial seal groove for receiving a test article. When the sample carrier is inserted in the test chamber, the at least one test article forms a seal between the sample carrier and at least one of the flange and the main body. Additionally, the seal formed by the test article is arranged between the inlet channel and the vent channel.

(A2) In some embodiments of the test fixture of (A1), at least one of the face seal groove or the radial seal groove are shaped to receive an O-ring and the test article is an O-ring.

(A3) In some embodiments of the test fixture of (A1), at least one of the face seal groove or the radial seal groove are shaped to receive a metal spring energized seal and the test article is a metal spring energized seal.

(A4) In some embodiments of the test fixture of at least one of (A1)-(A3), the flange bolts are fixedly attached to the main body and extend through bolt holes formed in the flange.

(A5) In some embodiments of the test fixture of at least one of (A1)-(A3), the flange bolts are fixedly attached to the flange and extend through bolt holes formed in the main body.

(A6) In some embodiments of the test fixture of at least one of (A1)-(A5), the sample carrier comprises a center channel and a bottom channel.

(A7) In some embodiments of the test fixture of at least one of (A1)-(A6), the seal surface of the flange comprises a protrusion that extends into the test cavity when the flange is attached to the main body.

(A8) In some embodiments of the test fixture of at least one of (A1)-(A7), the test cavity includes a shoulder that supports a flange of the sample carrier.

(A9) In some embodiments of the test fixture of (A1), the flange bolts extend through bolt holes formed in the main body and in the flange.

(A10) In some embodiments of the test fixture of at least one of (A1)-(A9), the inlet port and inlet channel are formed in the flange.

(A11) In some embodiments of the test fixture of at least one of (A1)-(A10), the vent port and vent channel are formed in the main body.

(A12) In some embodiments of the test fixture of at least one of (A1)-(A11), the test fixture includes two or more vent channels and vent ports.

(B1) In another aspect, use of the test fixture of at least one of (A1)-(A12) for testing fixtures used in a gas storage container is disclosed.

(C1) In yet another aspect, a method of testing a polymer seal in a high-pressure hydrogen test fixture is disclosed, where the method includes assembling a test article to a least one of a face seal groove and a radial seal groove of a sample carrier. The method also includes placing the sample carrier into a test cavity of the test fixture and closing the test fixture to form a test chamber by sealing the test article against the test fixture. The method further includes filling the test chamber with hydrogen gas pressurized to a predetermined test pressure. The method additionally includes depressurizing the test chamber and opening the test fixture to enable removal of the sample carrier.

(C2) In some embodiments of the method of (C1), the method also includes capturing leaks past the test article with a vent channel that is fluidly connected to a vent port.

(C3) In some embodiments of the method of (C2), the vent channel is formed between the test cavity and a vent seal.

(C4) In some embodiments of the method of at least one of (C1)-(C3), the test chamber is pressurized with hydrogen gas through an inlet channel that is fluidly connected to the test chamber and to an inlet port.

(C5) In some embodiments of the method of at least one of (C1)-(C4), the sample carrier comprises at least one of a face seal groove or a radial seal groove.

(C6) In some embodiments of the method of at least one of (C1)-(C5), the test cavity comprises a shoulder that supports a flange of the sample carrier.

(C7) In some embodiments of the method of at least one of (C1)-(C6), the test cavity comprises a shoulder that supports a flange of the sample carrier.

(C8) In some embodiments of the method of at least one of (C1)-(C7), the test fixture comprises a flange and a main body that are connected by a plurality of flange bolts that extend through bolt holes formed in at least one of the flange and the main body.

(C9) In some embodiments of the method of at least one of (C1)-(C8), the inlet port and the inlet channel are formed in the flange and the test cavity, the vent port, and the vent channel are formed in the main body.

(D1) Disclosed herein is a high-pressure test fixture, where the test fixture includes a main body that has a test cavity. The test fixture also includes a flange that covers the test cavity of the main body when the flange is attached to the main body to form a test chamber. The test fixture further includes securing means for securing the flange to the main body. The test fixture additionally includes sealing means for forming a seal between a sealing surface of the flange a seal groove of the main body when the flange is attached to the main body, where the sealing means is arranged in a seal groove of the main body. The test fixture also includes an inlet channel in fluid communication with the test chamber and an inlet port, a vent channel in fluid communication with the test chamber and a vent port, and a sample carrier that includes at least one of a face seal groove and a radial seal groove for receiving a test article. When the sample carrier is inserted in the test chamber, the at least one test article forms a seal between the sample carrier and at least one of the flange and the main body. Moreover, the seal formed by the test article is arranged between the inlet channel and the vent channel.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A high-pressure hydrogen test fixture comprising:
a main body comprising a test cavity;
a flange that covers the test cavity of the main body when the flange is attached to the main body to form a test chamber;
a plurality of flange bolts extending through at least one of the flange and the main body for securing the flange to the main body via a plurality of corresponding nuts;
a flange seal arranged in a seal groove of the main body, wherein the flange seal forms a seal between a sealing surface of the flange and the seal groove of the main body when the flange is attached to the main body;
an inlet channel in fluid communication with the test chamber and an inlet port;
a vent channel in fluid communication with the test chamber and a vent port;
a sample carrier comprising at least one of a face seal groove and a radial seal groove for receiving a test article;
wherein when the sample carrier is inserted in the test chamber, the test article forms a seal between the sample carrier and at least one of the flange and the main body;
wherein the seal formed by the test article is arranged between the inlet channel and the vent channel;
wherein the inlet port and the inlet channel are configured to supply pressurized hydrogen to the test chamber during a test operation; and
wherein the pressurized hydrogen pressurizes the test article to test the seal formed by the test article such that at least a portion of the pressurized hydrogen exits the test chamber, flows through the vent channel, and exits the vent port if the test article fails during the test operation.
2. The high-pressure hydrogen test fixture of claim 1, wherein at least one of the face seal groove or the radial seal groove are shaped to receive an O-ring and the test article is the O-ring.
3. The high-pressure hydrogen test fixture of claim 1, wherein at least one of the face seal groove or the radial seal groove are shaped to receive a metal spring energized seal and the test article is the metal spring energized seal.
4. The high-pressure hydrogen test fixture of claim 1, wherein the flange bolts are fixedly attached to the main body and extend through bolt holes formed in the flange.
5. The high-pressure hydrogen test fixture of claim 1, wherein the flange bolts are fixedly attached to the flange and extend through bolt holes formed in the main body.
6. The high-pressure hydrogen test fixture of claim 1, wherein the sample carrier comprises a center channel and a bottom channel.
7. The high-pressure hydrogen test fixture of claim 1, wherein the sealing surface of the flange comprises a protrusion that extends into the test cavity when the flange is attached to the main body.
8. The high-pressure hydrogen test fixture of claim 1, wherein the test cavity comprises a shoulder that supports a flange of the sample carrier.
9. The high-pressure hydrogen test fixture of claim 1, wherein the flange bolts extend through bolt holes formed in the main body and in the flange.
10. The high-pressure hydrogen test fixture of claim 1, wherein the inlet port and the inlet channel are formed in the flange.
11. The high-pressure hydrogen test fixture of claim 1, wherein the vent port and the vent channel are formed in the main body.
12. The high-pressure hydrogen test fixture of claim 1, further comprising two or more vent channels and vent ports.
13. A method of testing a polymer seal in a high-pressure hydrogen test fixture, the method comprising:
assembling a test article to a least one of a face seal groove and a radial seal groove of a sample carrier;
placing the sample carrier into a test cavity of the test fixture and closing the test fixture to form a test chamber by sealing the test article against the test fixture;
filling the test chamber with hydrogen gas pressurized to a predetermined test pressure during a test operation, wherein the hydrogen gas pressurizes the test article to test the polymer seal formed by the test article;
capturing at least a portion of the hydrogen gas that leaks past the polymer seal formed by the test article if the test article fails during the test operation; and
depressurizing the test chamber and opening the test fixture to enable removal of the sample carrier.
14. The method of claim 13, wherein the portion of the hydrogen gas that leaks past the polymer seal formed by the test article exits the test chamber, flows through a vent channel, and exits a vent port if the test article fails during the test operation.
15. The method of claim 14, wherein the vent channel is formed between the test cavity and a vent seal.
16. The method of claim 13, wherein the test chamber is pressurized with the hydrogen gas through an inlet channel that is fluidly connected to the test chamber and to an inlet port.
17. The method of claim 13, wherein the sample carrier comprises at least one of a face seal groove or a radial seal groove.
18. The method of any of claim 13, wherein the test cavity comprises a shoulder that supports a flange of the sample carrier.
19. The method of claim 13, wherein the test fixture comprises a flange and a main body that are connected by a plurality of flange bolts that extend through bolt holes formed in at least one of the flange and the main body.

20. A high-pressure hydrogen test fixture comprising:

a main body comprising a test cavity;

a flange that covers the test cavity of the main body when the flange is attached to the main body to form a test chamber;

securing means for securing the flange to the main body;

sealing means for forming a seal between a sealing surface of the flange and a seal groove of the main body when the flange is attached to the main body, where the sealing means is arranged in a seal groove of the main body;

an inlet channel in fluid communication with the test chamber and an inlet port;

a vent channel in fluid communication with the test chamber and a vent port;

a sample carrier comprising at least one of a face seal groove and a radial seal groove for receiving a test article;

wherein when the sample carrier is inserted in the test chamber, the test article forms a seal between the sample carrier and at least one of the flange and the main body;

wherein the seal formed by the test article is arranged between the inlet channel and the vent channel;

wherein the inlet port and the inlet channel are configured to supply pressurized hydrogen to the test chamber during a test operation; and wherein the pressurized hydrogen pressurizes the test article to test the seal formed by the test article such that at least a portion of the pressurized hydrogen exits the test chamber, flows through the vent channel, and exits the vent port if the test article fails during the test operation.

* * * * *